United States Patent
Zhang et al.

(10) Patent No.: US 7,342,919 B2
(45) Date of Patent: Mar. 11, 2008

(54) METHOD AND APPARATUS FOR PROVIDING INTERNET CALL WAITING WITH VOICE OVER INTERNET PROTOCOL

(75) Inventors: Li Zhang, Alpharetta, GA (US); Jeffrey P. Cassanova, Hiram, GA (US); Alan R. Blackburn, Woodstock, GA (US); Robert B. Collicott, Alpharetta, GA (US)

(73) Assignee: Phase Systems LLC, Wilmington, DE (US)

( * ) Notice: Subject to any disclaimer, the term of this patent is extended or adjusted under 35 U.S.C. 154(b) by 892 days.

(21) Appl. No.: 10/703,531

(22) Filed: Nov. 10, 2003

(65) Prior Publication Data

US 2004/0090954 A1 May 13, 2004

Related U.S. Application Data

(63) Continuation of application No. 09/416,054, filed on Oct. 12, 1999, now Pat. No. 6,661,785.

(51) Int. Cl.
*H04L 12/66* (2006.01)

(52) U.S. Cl. ...................... 370/352; 370/410

(58) Field of Classification Search ................ 370/352, 370/259, 401; 709/249, 217; 379/215.01
See application file for complete search history.

(56) References Cited

U.S. PATENT DOCUMENTS

| | | | |
|---|---|---|---|
| 5,600,710 A | 2/1997 | Weisser et al. | |
| 5,701,301 A | 12/1997 | Weisser, Jr. | |
| 5,805,587 A | 9/1998 | Norris et al. | |
| 5,809,128 A * | 9/1998 | McMullin | 379/215.01 |
| 5,838,774 A | 11/1998 | Weisser, Jr. | |
| 5,848,142 A | 12/1998 | Yaker | |
| 5,889,774 A | 3/1999 | Mirashrafi et al. | |

(Continued)

OTHER PUBLICATIONS

Hansson et al. "Phone Doubler—A Step Towards Integrated Internet and Telephone Communities" 1997 Ericsson Review, No. 4 pp. 142-151.

(Continued)

*Primary Examiner*—Chi Pham
*Assistant Examiner*—Albert T. Chou
(74) *Attorney, Agent, or Firm*—Connolly Bove Lodge & Hutz LLP

(57) ABSTRACT

An Internet Call Waiting—Voice over Internet Protocol (ICW-VOIP) service that uses a service control point and service node of a Public Switched Telephone Network (PSTN), acting as a gatekeeper and bridge respectively, to enable ICW subscribers to answer telephone calls during an internet session without having to disconnect internet access. The primary network components of the ICW-VOIP service comprise a proxy firewall, a service node, and a gateway. When a PSTN call is placed to a subscriber whose line is being used for internet access, the service control point accesses the subscriber's internet address from a database and transmits a message over the internet to the subscriber giving the subscriber the option to accept the call as a VOIP call. Once accepted, the subscriber places an H.323 call through the gateway to the service node. The service control point also forwards the PSTN call to the service node. Using bridging information, the service node matches the subscriber H.323 call and PSTN call and bridges them together to provide a VOIP connection.

19 Claims, 8 Drawing Sheets

U.S. PATENT DOCUMENTS

| | | | |
|---|---|---|---|
| 5,917,817 A | 6/1999 | Dunn et al. | |
| 5,946,381 A | 8/1999 | Danne et al. | |
| 5,958,016 A | 9/1999 | Chang et al. | |
| 5,974,133 A | 10/1999 | Fleischer, III et al. | |
| 6,005,870 A | 12/1999 | Leung et al. | |
| 6,014,379 A | 1/2000 | White et al. | |
| 6,078,581 A * | 6/2000 | Shtivelman et al. | 370/352 |
| 6,144,644 A * | 11/2000 | Bajzath et al. | 370/259 |
| 6,144,667 A * | 11/2000 | Doshi et al. | 370/401 |
| 6,178,183 B1 | 1/2001 | Buskirk, Jr. | |
| 6,212,261 B1 | 4/2001 | Meubus et al. | |
| 6,246,758 B1 | 6/2001 | Low et al. | |
| 6,253,249 B1 * | 6/2001 | Belzile | 709/249 |
| 6,353,611 B1 | 3/2002 | Norris et al. | |
| 6,366,661 B1 | 4/2002 | Devillier et al. | |
| 6,377,568 B1 | 4/2002 | Kelly | |
| 6,393,467 B1 * | 5/2002 | Potvin | 709/217 |
| 6,438,222 B1 | 8/2002 | Burg | |
| 6,661,785 B1 * | 12/2003 | Zhang et al. | 370/352 |
| 6,693,897 B1 | 2/2004 | Huang | |
| 6,711,401 B1 | 3/2004 | Chow et al. | |
| 6,757,274 B1 | 6/2004 | Bedingfield et al. | |
| 6,891,940 B1 | 5/2005 | Bhandari et al. | |
| 2002/0097710 A1 | 7/2002 | Burg | |
| 2002/0167940 A1 | 11/2002 | Low et al. | |
| 2002/0168055 A1 | 11/2002 | Crockett et al. | |
| 2003/0108172 A1 | 6/2003 | Petty et al. | |

OTHER PUBLICATIONS

Bellcore Document No. GR-1298-CORE "AINGR: Switching Systems" Section 2 and Section 3, Issue 4 (Sep. 1997).

Bellcore Document No. GR-1299-CORE, Switch Service Control Point (SGP)/Adjunct Interface, Issue 4 (Sep. 1997).

Bellcore Document No. GR-1298-CORE, AINGR: Switching System, Section 2 and Section 3, Issue 4, (Sep. 1997)

Bellcore Document No. GR-1299-CORE, Switching Service Control Point (SGP)/Adjunct Interface, Issue 4, (Sep. 1997).

Hansson et al., Phone Doubler—A step towards integrated Internet and Telephone Communities, 1997, Ericsson Review, No. 4, pp. 142-151.

* cited by examiner

SCP Call Setup Table

| Subscriber Calling Party # | Subcriber Internet Address | PSTN Caller # |
|---|---|---|
| 765-4321 | subscriber@ip | 123-4567 |

Figure 2f

Legend

PSTN to SN Call: PSTN Caller = 123-4567
Calling Party # = PSTN Caller # = 123-4567
Called Party # = PSTN MLHG # = 777-7777

Gateway to SN Call: Gateway Caller = 765-4321
Calling Party # = Subscriber # = 765-4321
Called Party # = Gateway MLHG # = 666-6666

SN Call Setup Table

| Line | PSTN Caller | Port # | Subscriber | Port # |
|---|---|---|---|---|
| 1 | 123-4567 | | 765-4321 | 1 |
| 2 | 123-4567 | | 765-4321 | 1 |
| 3 | 123-4567 | 2 | 765-4321 | 1 |

Figure 2e

METHOD AND APPARATUS FOR PROVIDING INTERNET CALL WAITING WITH VOICE OVER INTERNET PROTOCOL

This application is a continuation of U.S. patent application Ser. No. 09/416,054, filed Oct. 12, 1999, now U.S. Pat. No. 6,661,785, which is herein incorporated by reference in its entirety.

BACKGROUND

1. Field of the Invention

The present invention relates to telephony and the internet and, more specifically, to a telephone internet service that notifies an internet user of an incoming telephone call and provides the user with the option of receiving the telephone call while still maintaining an internet connection.

2. Background of the Invention

The most common method of internet access by individual and small business subscribers is by computer modem over conventional analog telephone lines. Subscribers connect to internet service providers (ISPs) by dialing access numbers from within communications applications. Once connected to the ISP, subscribers use internet applications, e.g., web browsers, to exchange data with the internet and browse the web.

While connected to the internet, the conventional analog telephone line is dedicated to data exchange between the subscriber's personal computer (PC) and the internet service provider, and as a result, cannot receive any telephone calls. Thus, when the telephone line is being used for internet access, the subscriber frequently misses incoming telephone calls. Several solutions have been proposed to alleviate this problem. However, each falls short of a complete solution.

One solution is to add another telephone line so that one line is dedicated to telephone calls and another line is dedicated to internet access. However, this solution burdens subscribers with the additional costs of another telephone line. In many cases, the relatively short amount of time spent on the internet by the average subscriber does not justify the installation and monthly service costs associated with a second telephone line.

In response to this service gap, telephony providers have turned to internet call waiting services to notify internet users of incoming telephone calls. Internet call waiting services enable subscribers to receive traditional telephone calls while connected to the internet through a single telephone line. These services send an incoming call message detailing calling party information through a pop-up window on the subscriber's computer screen. In response to this message, a subscriber can accept the call, route the call to voice mail, redirect the call to another number, play a message to the caller, or simply ignore the call. If the subscriber accepts the call, the internet call waiting service terminates the internet connection and connects the call to the user's regular telephone. However, subscribers still do not have the ability to use a single telephone line to simultaneously carry on a voice conversation and continue using the internet.

In response to the drawbacks of internet call waiting services, Internet Protocol (IP) telephony service providers, e.g., eFusion, Inc., have developed internet call waiting services that support a conventional public switched telephone network (PSTN) call during an internet session on one telephone line. These services are typically referred to as internet call waiting with voice over internet protocol (ICW-VOIP) services. With this type of service, an internet subscriber can accept an incoming call, carry on a conversation as part of the call, and continue to browse the web during the call. Incoming PSTN calls are forwarded to application gateways that complete the calls through internet connections to the subscriber's personal computer. In addition, subscribers can place outbound calls during an internet session to a conventional PSTN telephone number, complete with Dual Tone Multi-frequency tone generation. The subscriber communicates over the internet to the application gateway, which completes the call using the PSTN.

Although ICW-VOIP services have partially addressed the problems associated with simultaneous telephone calls and internet sessions, these systems fail to efficiently use existing network resources, relying instead on complex software applications layered on top of PSTN and IP network architectures. Such a system is disclosed, for example, in U.S. Pat. No. 5,889,774, which describes an elaborate method of selecting internet/PSTN changeover servers to establish a voice call to a PSTN extension on behalf of a networked client computer. Because these systems must route voice calls through one or more changeover servers to maintain an initial internet connection, the systems suffer from reduced transmission speed, quality, reliability, and security. In packet-switched voice communication, these transmission deficiencies result in perceptible delays and breaks in conversation.

ICW-VOIP service providers have relied on software because of the inability of gateways to support PSTN-to-IP mapping. For example, H.323 gateways are not capable of completing connections between PSTN telephones and personal computers, and do not have standardized interfaces for querying external databases. (The term "H.323" as used herein refers to the internet telephony standard for real-time multimedia communications for packet-based networks with which components and communications must comply.) Typically, these types of gateways are engineered specifically for gateway-to-gateway long distance bypass calls, in which subscribers avoid long distance toll charges by routing voice communication over the packet-switched internet. In long distance bypass systems, transmissions are translated between voice circuit-switched and data packet-switched communication at both sides of a communication. The gateways can support IP-to-PSTN communication, PSTN-to-PSTN communication, and IP-to-IP communication, but not PSTN-to-IP. Thus, a gateway cannot receive a PSTN call, map an IP call to the appropriate subscriber, or initiate a call to the subscriber to complete a connection. Some gateways, implemented with different variations of the H.323 protocol, do not even support IP-to-PSTN communication.

In contrast to the inefficient and slow routing of the ICW-VOIP software services and the lack of intelligent functionality of the gateways, PSTN Advanced Intelligent Networks (AINs) offer the ability to quickly route calls and terminate connections based on subscriber information. AIN networks use a complex, high speed, high traffic volume data packet-switched messaging system to provide versatility in the handling of telephone calls. The Advanced Intelligent Network System is described in U.S. Pat. Nos. 5,701,301 and 5,838,774, which are hereby incorporated by reference.

The AIN enables telecommunications call control and database access from any computer or switching system connected to the Signaling System 7 (SS7) network. The Signaling System 7 (SS7) network refers to the current implementation of the Common Channeling Interoffice Signaling control network used in the United States. The Advanced Intelligent Network (AIN) is a standard call control protocol that uses the SS7network for message transport.

AIN infrastructures of the PSTN include service switching points (SSPs), service nodes (SNs), signal transfer points (STPs), and signal control points (SCPs) with databases. An example of a local PSTN structure 102 is shown in FIG. 1a. The signal control point is a computer that holds, accesses, and maintains the database and communicates with the SSP in directing call routing. The database stores subscriber-specific information used by the network to route calls. The SSP communicates with the SCP and queries the SCP for subscriber-specific instructions as to how calls should be completed. The signal transfer point is a packet switch that shuttles messages between the signal control point and the signal service point. The service node is a smart termination that can assess incoming call information and make appropriate connections.

Much of the intelligence and the basis for many of the new enhanced features of the network reside in the local service control point (SCP). As known by those skilled in the art, service control points are physically implemented by relatively powerful fault tolerant computers. Typical implementation devices include the Star Server FT Model 3200 and the Star Server FT Model 3300, both available from Lucent Technologies™. The architecture of these computers is based on Tandem Integrity S2 and Integrity S1 platforms, respectively. In most implementations of a public switched telephone network, service control points are also provided in redundant mated pairs to ensure network reliability.

The service control points maintain the network databases used in providing custom services, such as databases that identify customers requiring particular services. To keep the processing of data and calls as simple and as generic as possible at switches, triggers are defined at the switches for each call. Each trigger is assigned to a particular subscriber line or call, and prompts a query to a service control point. The service control point then checks its database to determine whether a customized calling feature or custom service should be implemented for this particular call, or whether conventional plain dialed-up telephone service (POTS) should be provided for the call. The results of the data base inquiry are sent back to the switch from the SCP. The return message includes instructions to the switch as to how to process the call. The instruction may be to take some special action as a result of a customized calling service or custom feature. If a "continue" message is received at the switch from the SCP, the call is treated as a POTS-type call. The switch will then move through its call states, select the call digits, and may generate further messages that will be used to set up and route the call, as described above.

Despite the benefits of advanced call routing capabilities, AIN networks are limited by the Signaling System 7 communication in their ability to exchange data with other networks, such as the internet. Thus, the benefits of the specialized AIN services have necessarily been confined to the PSTN infrastructure. However, as the internet has expanded and the demand for subscriber access has grown, the need for a capable interface between the IP network and the PSTN infrastructure has become increasingly important. Thus, the inability of conventional systems to seamlessly exchange data across the IP and PSTN networks limits the potential services available to subscribers.

Therefore, there remains a need for a combined IP and PSTN architecture that enables communication between IP and PSTN protocol. Within this architecture, there remains a need for an ICW-VOIP service that avoids the complicated software solutions of the prior art, compensates for the limited communication capabilities of gateways, and provides fast, reliable, and secured voice communication. This service should eliminate the complex process of selecting and engaging internet/PSTN changeover servers and, instead, should take advantage of existing reliable telephone network resources to provide single-line subscribers with the convenience of answering telephone calls while still maintaining internet access. Furthermore, this service should be easily adaptable to accommodate future advances in gateway technology and compatibility.

SUMMARY OF THE INVENTION

The present invention is an Internet Call Waiting—Voice over Internet Protocol network architecture that uses an Advanced Intelligent Network to seamlessly merge local PSTN service with internet systems. The invention facilitates PSTN-to-IP calls using VOIP and existing telephone network resources. Using the fast, reliable, and secured PSTN infrastructure, the present invention enables ICW subscribers to answer telephone calls during internet sessions without having to disconnect internet access.

The present invention is an IP/PSTN architecture in which an SCP functions as a gatekeeper, an H.323 gateway functions as a protocol translator, and an SN functions as a bridge that connects calls. As the gatekeeper, the SCP stores subscriber information, maps calls based on the subscriber information, and issues instructions directing calls between the IP and PSTN networks. As the protocol translator, the H.323 gateway receives an H.323 call initiated from the subscriber's PC, translates the H.323 (IP) call to a PSTN call, and forwards the PSTN call to the SN. As the bridge, the SN receives calls from the H.323 gateway and PSTN caller (i.e., from the IP and PSTN sides of the network), matches the calls based on the instructions from the SCP and the called party number of each call, and bridges the calls to enable PSTN-to-IP communication and ICW-VOIP.

To initiate internet access, a subscriber dials a public feature code, e.g., *28, followed by the telephone number of the subscriber's ISP. The public feature code activates a trigger provisioned on the subscriber's telephone line. Upon receiving the public feature code, the subscriber's SSP sends an event notification query to an SCP, asking for further instruction. The SCP records the subscriber's calling party number into an SCP call setup table, and instructs the SSP to route the call to the specified ISP number. The SCP then waits for a registration message from the subscriber's PC.

Once the subscriber's PC is connected to the internet, the subscriber's PC sends a registration message to the SCP. (The internet address of the SCP is provisioned on the subscriber's PC as a part of service initiation.) The registration message includes the telephone number and internet address of the subscriber. Upon receiving the registration message, the SCP matches the subscriber telephone number from the registration message with the subscriber calling party number previously entered into the SCP call setup table, and adds the subscriber's internet address to the table entry.

With the table entry complete, the SCP provisions a termination attempt trigger on the subscriber's SSP. The SCP uses this trigger to detect calls to the subscriber's line. When the subscriber line receives a call, the SSP sends a trigger event notification query to the SCP. Based on information in the trigger event notification query, the SCP instructs the SSP on how to handle the incoming call. After activation of the termination attempt trigger, the SCP sends a registration confirmation message back to the subscriber's PC. This registration confirmation message includes the internet address of the H.323 gateway, and a user identification and password. Later in the process of the present invention, the subscriber's PC will need the H.323 gateway internet address and the user identification and password to initiate an H.323 call to the H.323 gateway. At this point, registration of the subscriber's PC is complete.

When the subscriber's line receives a call, the subscriber's SSP sends a termination attempt trigger notification query to the SCP. In response to the notification query, the SCP sends a call notification message through the internet to the subscriber's PC, informing the subscriber that a call is incoming. Through cooperative software provisioned on the subscriber's PC and the SCP, the subscriber's PC displays the call notification message as a "pop-up" window during the subscriber's internet session. This pop-up window displays the caller information and presents the subscriber with call disposition options as described in the next paragraph.

The pop-up window presents the subscriber with the following options: 1) ignore the call; 2) forward the call to voicemail or any other PSTN number; 3) accept the call directly over the PSTN line and terminate the internet connection; 4) maintain the internet connection and accept the call through the computer using VOIP; or 5) hold the call until the caller hangs up, or until the subscriber accepts the call over PSTN, accepts the call over VOIP, or forwards the call.

If the subscriber chooses the fourth option, the subscriber's PC sends an "answer with VOIP" message to the SCP, and, in turn, the SCP sends a notification to the SN that a VOIP call bridging will be required. This notification message includes the PSTN caller's telephone number as the calling party and the subscriber's telephone number as the called party. The SN enters this notification information into an SN call setup table. After sending the "answer with VOIP" message to the SCP, the subscriber's PC immediately initiates a H.323 call to the H.323 gateway using the H.323 gateway internet address and the user identification and password received in the registration confirmation message.

Upon receiving the H.323 call from the subscriber's PC, the H.323 gateway converts the H.323 call into a PSTN call and routes the PSTN call to the SN for call bridging. To accomplish this call routing, the present invention uses a double-triggering mechanism, which activates, for a second time, the termination attempt trigger previously provisioned on the subscriber's line. In this manner, the H.323 gateway calls the subscriber phone number to route the PSTN call to the SN. Because the termination attempt trigger is still provisioned on the subscriber line, the subscriber's SSP sends another termination attempt trigger notification query to the SCP when the subscriber's SSP receives the call from the H.323 gateway.

Recognizing from the calling party number that the PSTN call is from the H.323 gateway, the SCP issues a routing instruction to the SSP that replaces the calling party number with the subscriber's phone number and replaces the called party number with the number of a multi-line hunt group (MLHG) pre-provisioned on the SN. (Two MLHG numbers are pre-provisioned on the SN for the present invention: one number is for calls from the H.323 gateway and the other number is for calls from PSTN callers.) Based on the SCP instructions, the SSP routes the PSTN call from the H.323 gateway to the gateway MLHG on the SN.

When the SN receives the PSTN call from the H.323 gateway, the SN checks the calling party number of the call against the SN call setup table. If the SN finds a match between the calling party number of the call and a subscriber number in the call setup table, the SN sends an H.323 gateway call arrival confirmation message to the SCP. Then, the SN waits for the arrival of the call from the PSTN caller for the call bridging.

When the SCP receives the H.323 gateway call arrival confirmation from the SN, the SCP instructs the SSP to forward the call from the PSTN caller to the MLHG number provisioned on the SN for calls from PSTN callers. The SCP waits for a call connection confirmation message from the SN.

When the SN receives the PSTN caller's call, the SN checks the calling party number of the call. If the SN finds a match between the calling party number of the call and a PSTN caller number in the SN call setup table, the SN connects a port of the gateway MLHG to a port of the PSTN MLHG, thereby connecting the PSTN call to the gateway call from the subscriber PC. Once connected, the SN sends a call connection notification back to the SCP. At this point, the call bridging is complete. The H.323 call from the subscriber's PC to the H.323 gateway represents the IP portion of the call, while the PSTN portion of the call is from the H.323 gateway to the SSP, from the SSP to the SN, from the SN back to the SSP, and from the SSP to the PSTN caller. The functions of the SN and its MLHGs are discussed in more detail below in "Detailed Description of the Invention."

Once the connection is established, the subscriber can conduct voice communication over the internet while continuing to browse the web. The SN maintains the connection between the subscriber and PSTN caller to keep the SCP in control of the routing so that the call can be disconnected and forwarded to another number or reverted back to the subscriber's PSTN line should the subscriber choose to do so. If the subscriber chooses to forward the call and the call is not answered, the call is reconnected to the subscriber for additional VOIP conversation and the SCP and SN wait for further direction from the subscriber.

In the ICW-VOIP architecture of the present invention, the SN compensates for the limited capabilities of currently available gateways, i.e., the gateways that do not support PSTN-to-IP communication. However, in the event that gateway technology advances to satisfy this need, the present invention is easily adaptable to new hardware options. In a preferred embodiment of the present invention, in which the gateway acquires the capabilities and functions of the SN, the gateway handles PSTN-IP communication, supporting the launching of calls through the gateway directly to the subscriber. This embodiment eliminates the need to bridge calls through the SN and still maintains the ability to break, forward, and revert calls.

For simplicity, this specification describes the present invention in terms of a single SSP and a single H.323 gateway. However, as well known by those skilled in the art, the single SSP represents one or more SSPs and the single gateway represents one or more gateways. FIG. 1b illustrates this concept. For capacity and reliability, several H.323 gateways could be connected to several SSPs in a serving area. In this configuration, the SCP would decide which H.323 gateway to use for a particular call and would perform the load balancing among all of the H.323 gateways. The PSTN caller and subscriber could reside on the same SSP or different SSPs. The SSPs could also be located in the same serving area or different serving areas. If the SSPs are located in different serving areas, a trunking connection would be made via SS7 signaling between the PSTN caller's SSP and the subscriber's SSP. When the trunking connection is made to the subscriber's SSP, the termination attempt trigger provisioned on the subscriber's SSP is sent to the SCP. Thus, it should be understood that the terms "SSP" and "gateway," as used in this specification and in the claims, mean one or more SSPs and one or more gateways, respectively.

Accordingly, it is an object of the present invention to provide a fast, reliable, and secured ICW-VOIP service that allows single telephone line subscribers to accept incoming voice calls while continuing to browse the internet.

It is another object of the present invention to provide fast, high-quality ICW-VOIP service that reduces perceptible delays and breaks in voice conversation.

It is another object of the present invention to compensate for a gateway's inability to map PSTN-to-IP calls and to support PSTN-to-IP communication.

It is another object of the present invention to provide an easily adaptable ICW-VOIP architecture that will accommodate future advances in gateway capabilities.

It is another object of the present invention to merge the IP network with the PSTN infrastructure to enable seamless Signaling System 7 communication between PSTN callers and internet users.

These and other objects of the present invention are described in greater detail in the detailed description of the invention, the appended drawings, and the attached claims.

DESCRIPTION OF THE DRAWINGS

FIG. 2e is a schematic diagram of a service node call setup table.

FIG. 2f is a schematic diagram of a service control point call setup table.

DETAILED DESCRIPTION OF THE INVENTION

Figure 1A:
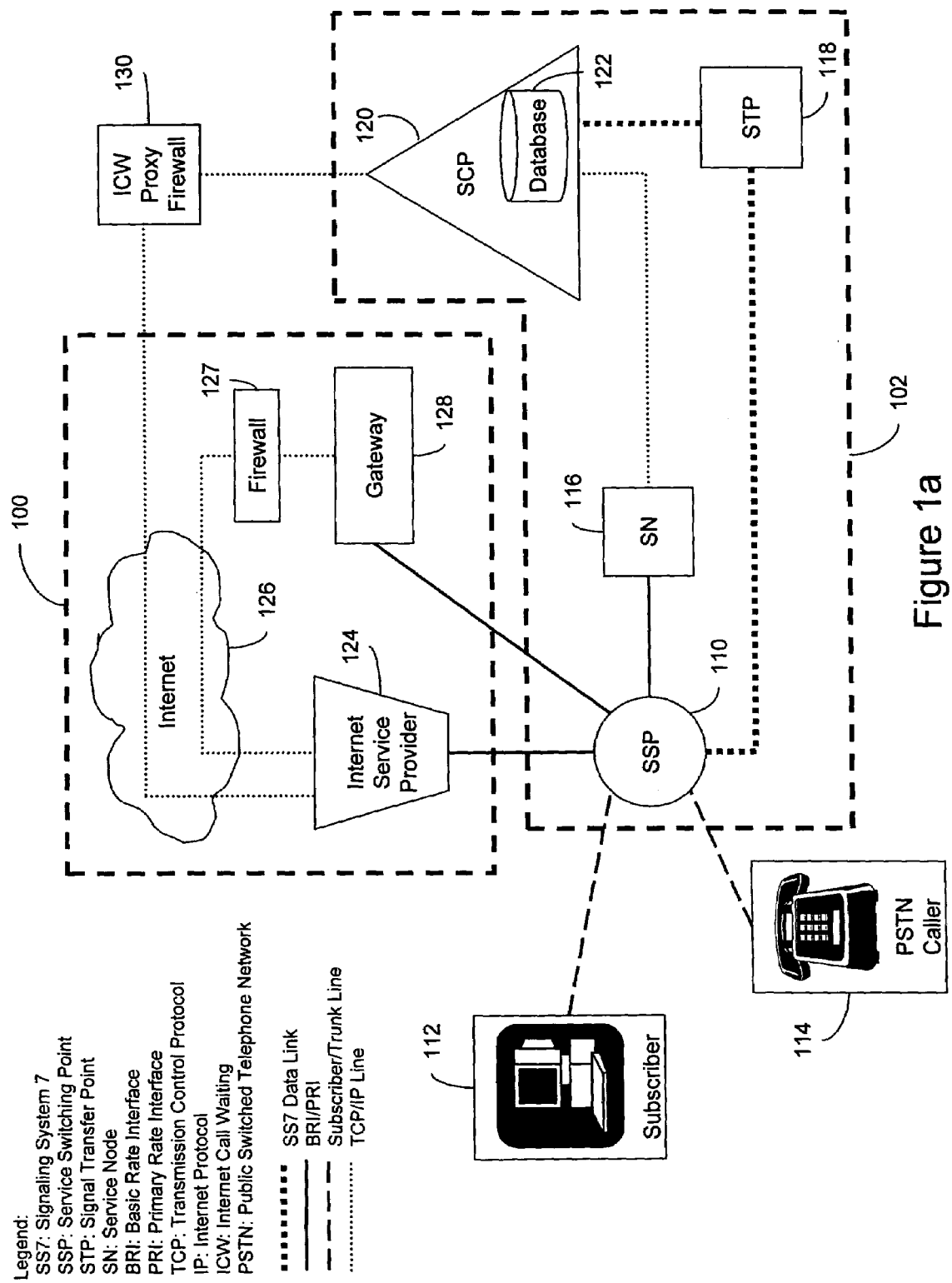
FIG. 1a is a schematic diagram of the ICW-VOIP architecture of the present invention.
Figure 1B:
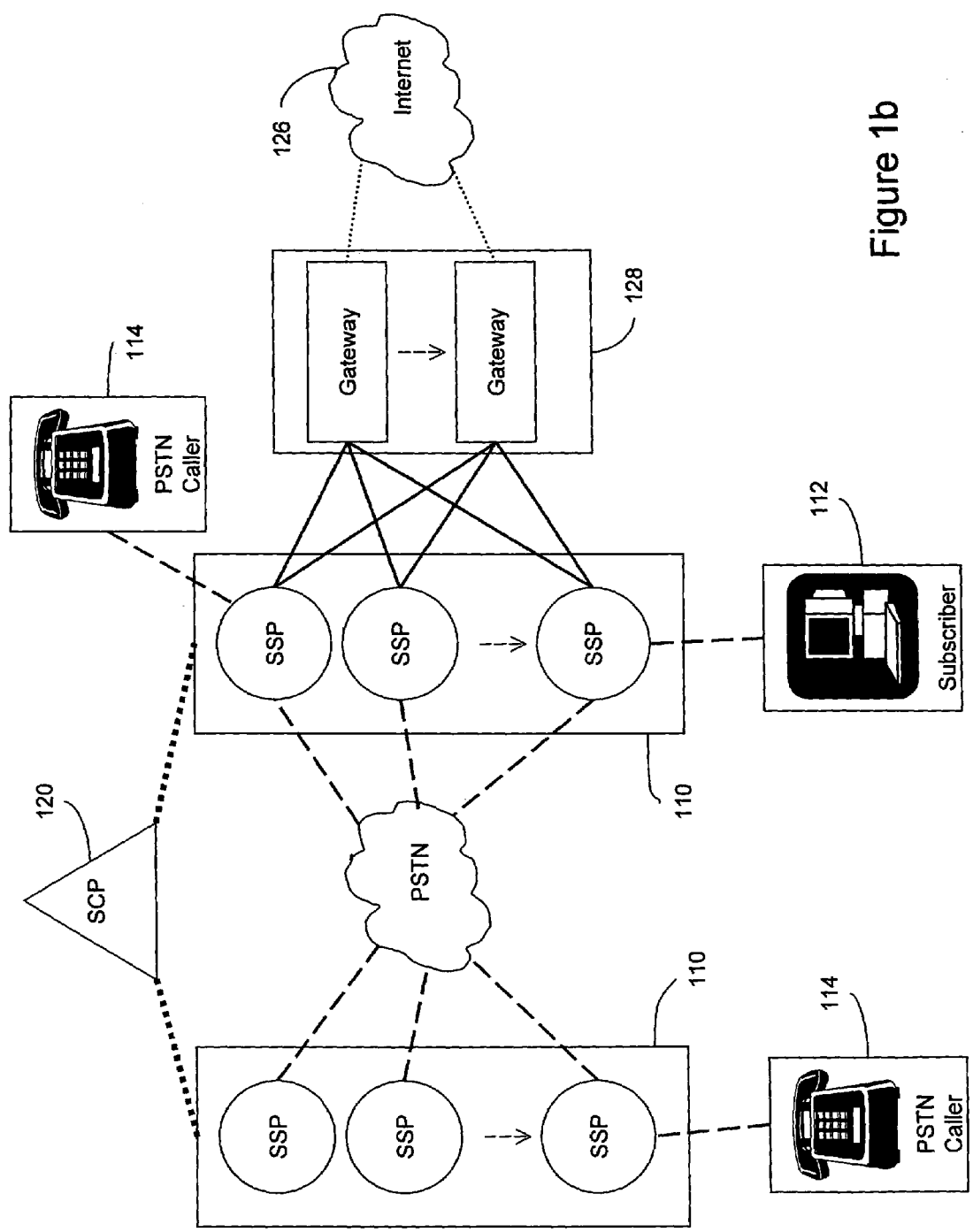
FIG. 1b is a schematic diagram of the ICW-VOIP architecture of the present invention illustrating multiple SSPs and gateways.

The present invention comprises an SCP, an SN, an SSP, an ISP, an internet system, a gateway, and a proxy firewall. As shown in FIG. 1a, the ICW-VOIP architecture of the present invention merges the local PSTN infrastructure with the IP network. A subscriber and a PSTN caller are connected to a service switching point (SSP). As would be apparent to one skilled in the art, the SSP could be one or more service switching points located together or apart. As the central connection between the PSTN and IP architectures, the SSP connects to an internet service provider for the subscriber's internet access, to a gateway for PSTN/IP interface, and to an SN for bridging calls between the PSTN caller and the gateway. The gateway converts IP voice communication from the subscriber into normal PSTN voice communication. The SN acts as a bridge, connecting a call from the PSTN caller and a call from the subscriber through the gateway. The proxy firewall provides protection for the LAN operating in the PSTN by controlling access to Transmission Control Protocol/Internet Protocol (TCP/IP) elements of the network. The proxy firewall operates by forwarding messages between certain entities and only to and from those entities and ports.

As shown in FIG. 1a, the preferred embodiment of the present invention seamlessly merges an IP network 100 with a local PSTN infrastructure 102 through a central service switching point SSP 110. On the access side of this architecture, a subscriber 112 and a PSTN caller 114 connect through subscriber lines to SSP 110. SSP 110 is shown as a single service switching point for convenience, but could be one or more service switching points located together or apart in communication over the AIN. In the local PSTN portion of the architecture, SSP 110 communicates with a service node, SN 116, through a Basic Rate Interface (BRI) line using a message-oriented signaling protocol, e.g., Primary Rate Interface (PRI)/Q.931. SSP 110 also communicates with a signal transfer point STP 118 through an SS7data link using SS7protocol, e.g., Transactional Capabilities Application Part/Signal System 7 (TCAP/SS7) protocol. SN 116 is connected to a service control point SCP 120 through an internet protocol link, e.g., Transmission Control Protocol/Internet Protocol. SCP 120 contains a database 122 and is connected to STP 118 through an SS7data link using SS7protocol, e.g., TCAP/SS7.

Within the IP portion, an internet service provider, ISP 124, is connected to SSP 110 over a communication line (e.g., BRI, T-1, or T-3) and to the internet 126 through an internet protocol link, e.g., TCP/IP. Internet 126 is, in turn, connected to a gateway 128 (optionally, through firewall 127) over an internet protocol link, e.g., TCP/IP, and to an ICW proxy firewall 130 over an internet protocol link, e.g., TCP/IP. ICW proxy firewall 130 is connected to internet 126 one side and to SCP 120 on the other side over an internet protocol link, e.g., TCP/IP. ICW proxy firewall 130 protects the local PSTN infrastructure 102 from uncontrolled access by internet 126. Finally, gateway 128 connects to SSP 110 through a BRI/PRI line to provide a path over which gateway 128 can call SSP 110.

System Components

In this architecture, the individual components have the following functions. SSP 110 acts as the central switch of the architecture, receiving incoming calls, initiating queries to SCP 120 (through STP 118), and routing the calls to destinations specified by SCP 120. SSP 110 is the access point through which subscriber 112 reaches ISP 124 and through which PSTN caller 114 reaches the PSTN infrastructure. As would be apparent to one skilled in the art, SSP 110 could be one or more service switching points located together or apart.

ISP 124 provides subscriber 112 with access to the internet and the world wide web. Typically, a subscriber reaches ISP 124 by either dialing an ISP number from the subscriber's computer, modem, and telephone line, or by using a dedicated line installed by a telephone company. Subscriber 112 is used herein to refer to the user of the service, as well as to the user's computer and computer software. The term "computer" as used herein refers to a portion of a computer, a single computer, or one or more computers in communication with each other. Suitable internet service providers include but are not limited to BellSouth.Net™, Mindspring™, and America Online™.

SCP 120 is a computer that recognizes triggers from SSP 110, identifies incoming call information and signals from IP network 100 and PSTN infrastructure 102, consults database 122 for subscriber information, and issues routing instructions to SSP 110 based on the call and subscriber information. In addition to the ICW functions of the prior art, to support VOIP during an internet session, SCP 120 also serves the following functions: 1) it receives and processes a message from the subscriber 112, by which subscriber 112 requests that he or she answers a call over the IP; 2) it receives and processes a message from the subscriber 112 requesting that an incoming PSTN call be forwarded to another number, which can be the dialing number of the subscriber; 3) it receives and processes an incoming PSTN call and routes the call to SN 116 for bridging; 4) it receives and processes an H.323 gateway call and routes the call to SN 116 for bridging; and 5) it handles messages from the subscriber 112 and SN 116 to coordinate call set-up and tear-down.

SN 116 serves a bridging function, by receiving two calls and connecting them to each other. One call is from PSTN caller 114 and the other call is from gateway 128. A service package application provisioned on SN 116 recognizes incoming calls and call information, and matches the information to connect the two calls. A multi-line hunt group is pre-configured on the SN 116 to receive a call from gateway 128. SN 116 records in a subscriber call entry of a call setup table the port number of the multi-line hunt group that received the call from gateway 128. When SN 116 receives the PSTN caller's call on a second multi-line hunt group, SN 116 searches the SN call setup table for the corresponding subscriber data entry, finds the port number on which the call from gateway 128 was received, and bridges the two calls to each other.

ICW proxy firewall 130 protects the Local Access Network from uncontrolled access by third parties over the internet by forwarding messages between certain entities and only to and from those entities and ports. Firewall 127 provides similar protection between internet 126 and gateway 128.

Gateway 128 converts packet-based IP voice communications into normal switched-based PSTN voice communications. Gateway 128 receives H.323 messages from subscriber 112 via SSP 110, ISP 124, internet 126, and firewall 127, converts the messages to PSTN protocol, and forwards them to SSP 110 and SN 116. The gateway serves the following functions: 1) compresses, decompresses, and packetizes voice and fax streams; 2) authenticates subscribers trying to make a call, administers gateways, sets up calls on behalf of the originating subscriber, and locates a destination gateway based on the destination telephone number; and, 3) stores gateway configurations and provides a web based user interface for data management. An example of a commercially available gateway that will satisfy these functions is the Lucent ITS-SP.

Subscriber 112 must have software that produces H.323 real-time multimedia communication for packet-based networks. Preferably, the software includes Microsoft NetMeeting™ and a Microsoft Visual™ C++6.0 application with Microsoft Foundation Class™ as the graphical user interface. Subscriber 112 uses Component Object Model interactions with NetMeeting™ to place VOIP calls. In addition to software, subscriber 112 requires telephony hardware, including, for example, a 56K modem, a duplex sound card, speakers, and microphone. In addition to this preferred software and hardware, the present invention can use any software that provides specific protocols, messages, and formats that allow the PC software and SCP 120 to communicate over TCP/IP and enable ICW-VOIP communication between subscriber 112 and SCP 120.

System Operation

Figure 2A:
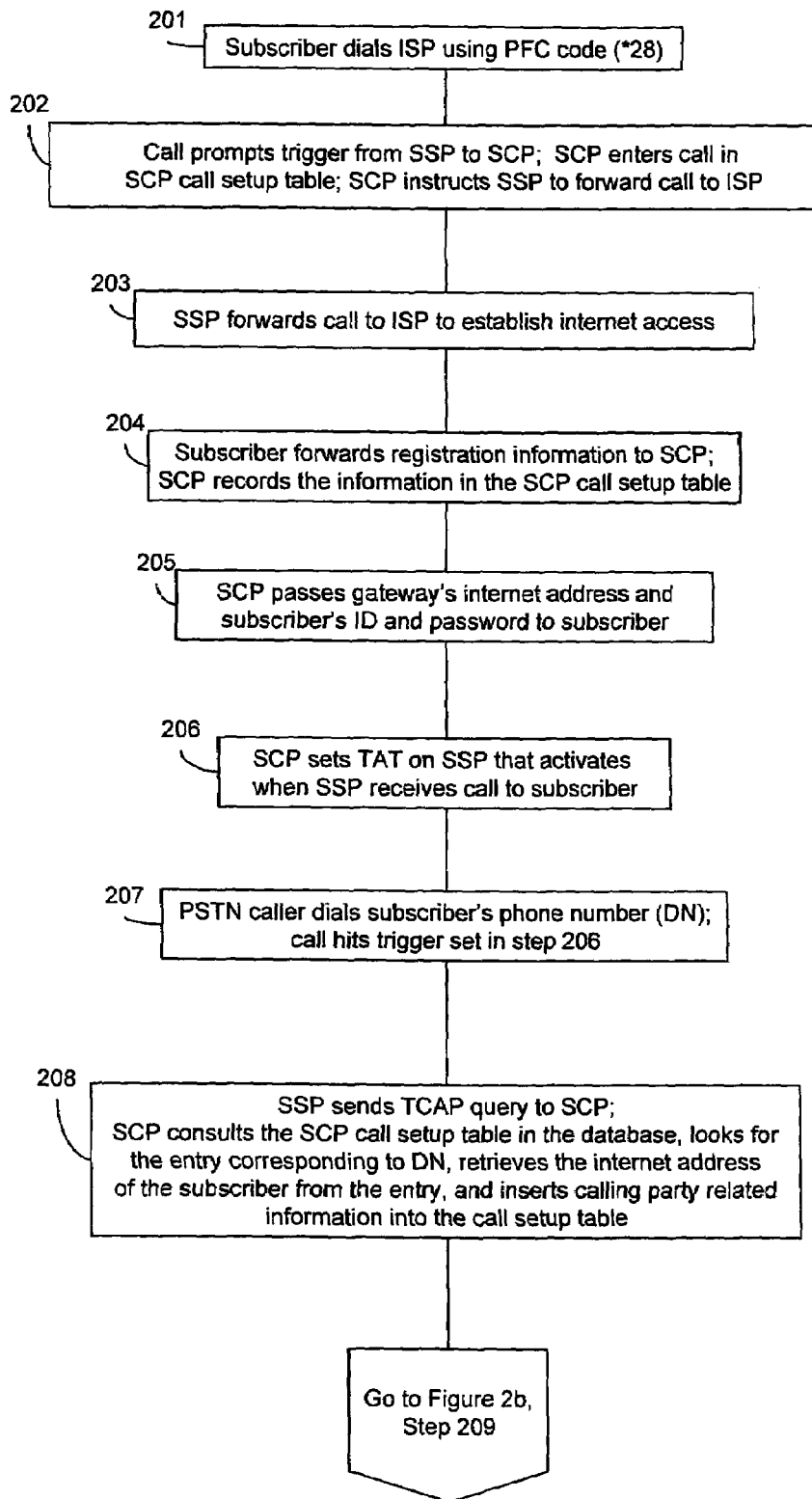
FIGS. 2a-2c are charts outlining the call flows of the present invention, when a subscriber has chosen to accept an incoming voice call while maintaining an internet connection.
Figure 2B:
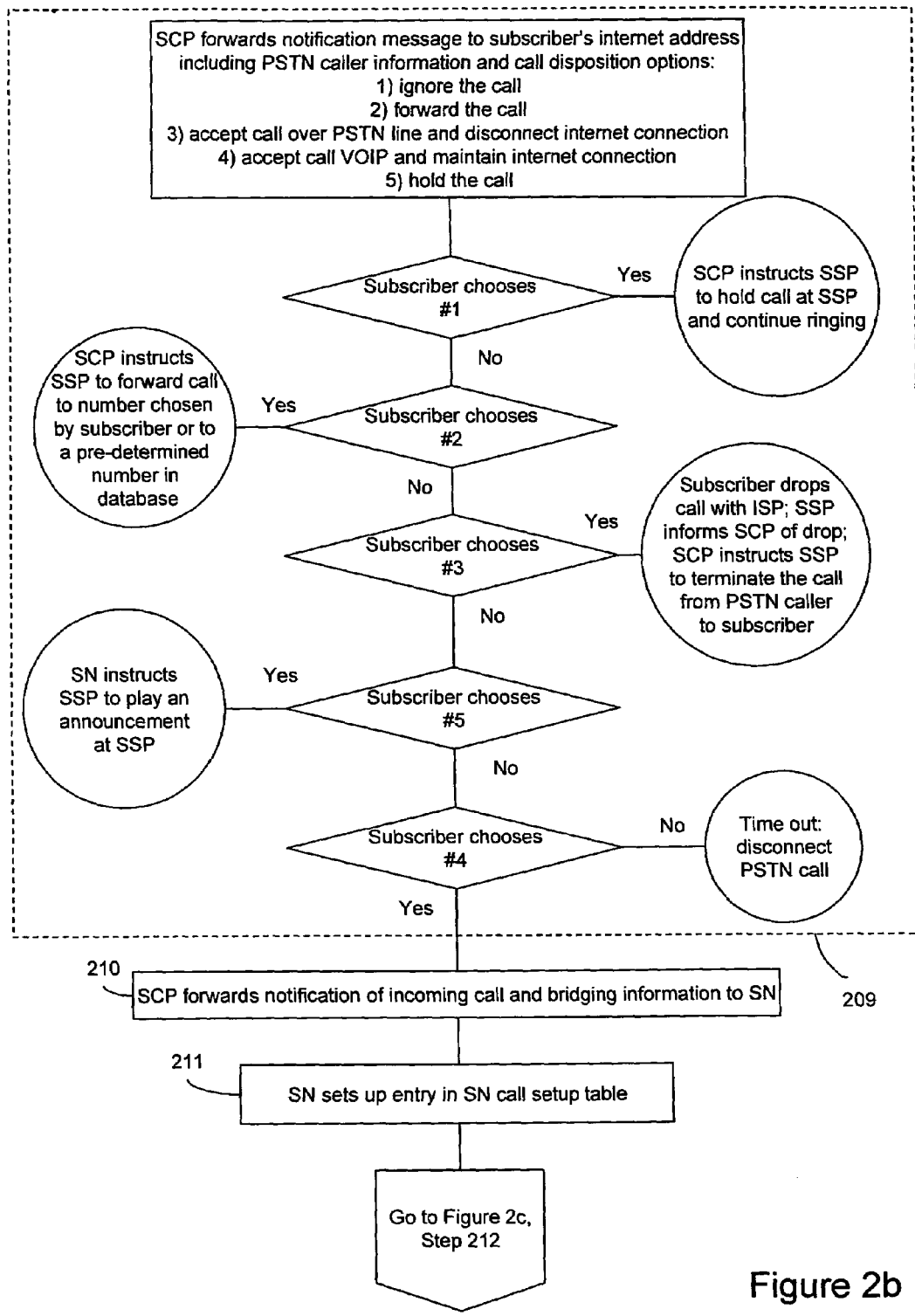
Figure 2C:
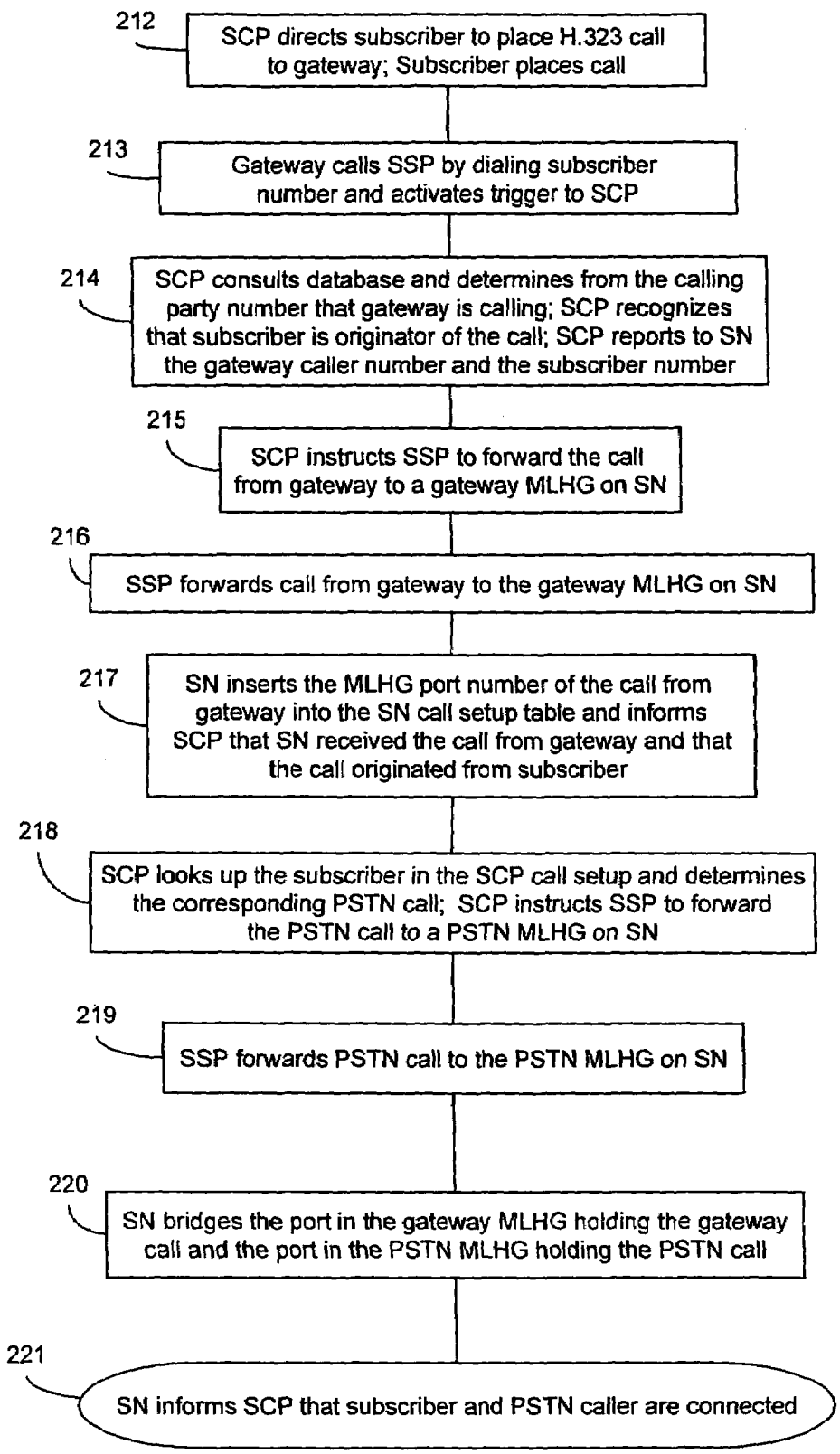
Figure 2D:
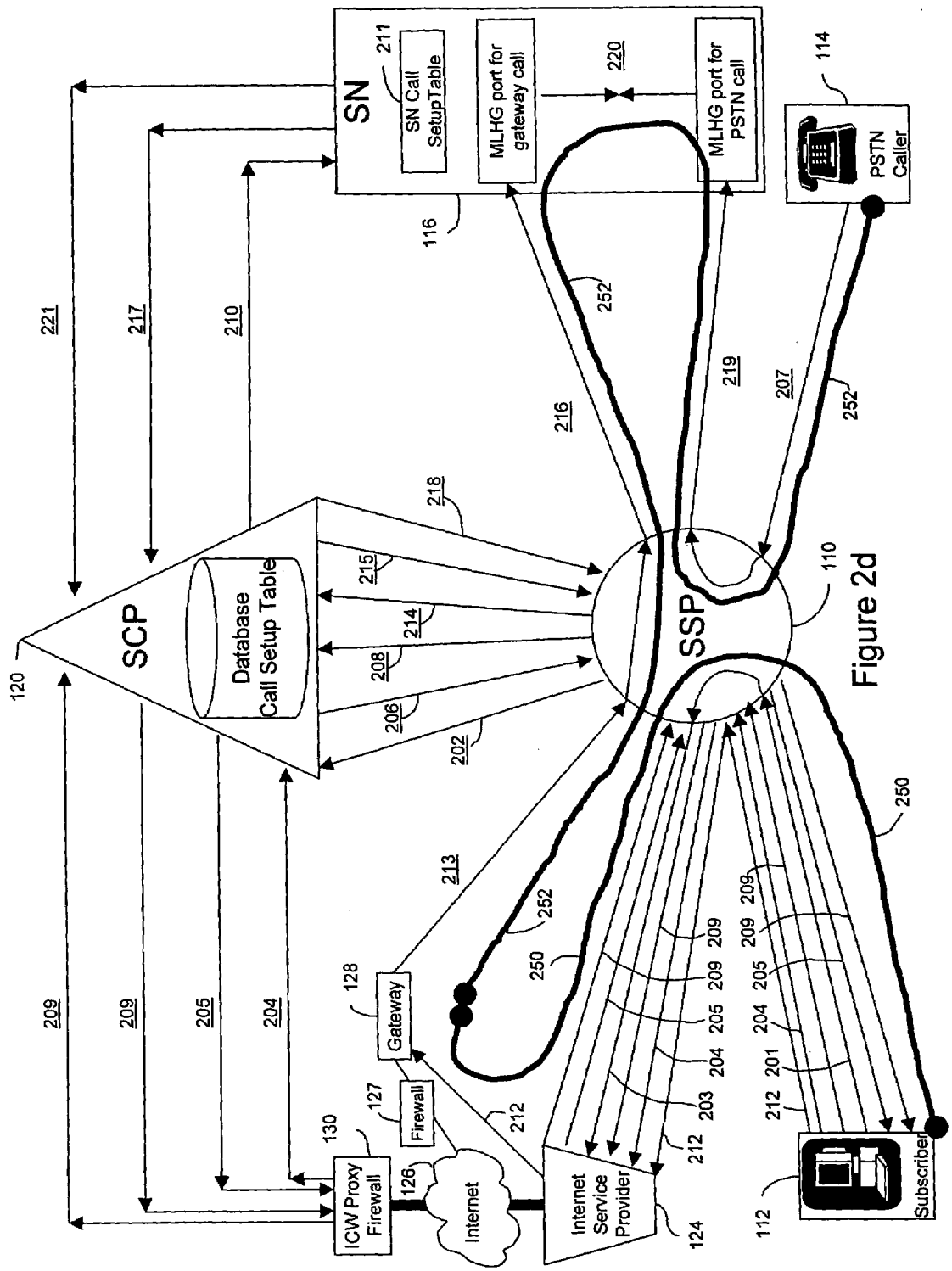
FIG. 2d is a schematic diagram relating the call flows described in FIGS. 2a-2c to the system architecture.

FIGS. 2a-2c are flowcharts that trace the call flows of the present invention. FIG. 2d is an overall schematic of the ICW-VOIP architecture, illustrating the operation of the system components and the call flows between the components. In FIG. 2d, each call flow is represented by an arrow with a reference number corresponding to a flowchart step from FIGS. 2a-2c.

While the system operation described herein and illustrated in the flowcharts (FIGS. 2a-2c) contains many specificities, these specificities should not be construed as limitations on the scope of the invention, but rather as an example of one preferred embodiment thereof. As would be apparent to one of ordinary skill in the art, many other variations on the system operation are possible, including differently grouped and ordered method steps. Accordingly, the scope of the invention should be determined not by the embodiments illustrated, but by the appended claims and their legal equivalents.

In step 201, to initiate an internet connection, subscriber 112 dials ISP 124 using a public feature code (PFC) code, e.g., *28. This call hits a PFC trigger at SSP 110 that prompts SCP 120, in step 202, to find a location to enter an active call in an SCP call setup table. While the PFC trigger is prompting SCP 120, SCP 120 directs SSP 110 to forward the call from subscriber 112 to ISP 124 in step 203. This connection establishes internet access for subscriber 112.

In step 204, subscriber 112 forwards registration information to SCP 120 including, for example, the telephone number and internet address of subscriber 112. SCP 120 records this information in the SCP call setup table that was prepared in step 202. This exercise provides SCP 120 with the information it needs to reach subscriber 112 through internet 126.

In step 205, SCP 120 passes the internet address of gateway 128 to subscriber 112 as well as the user identification and password of subscriber 112. Subscriber 112 retains this gateway access information for identification purposes later in the call flow process. Specifically, having the internet address of gateway 128 enables subscriber 112 to initiate a VOIP call to gateway 128. Having the user identification and password of subscriber 112 gives subscriber 112 access to make a call to SSP 110 through gateway 128.

In step 206, SCP 120 sets a trigger on SSP 110 that activates when SSP 110 receives a call to the telephone number of subscriber 112. Preferably this trigger is a termination attempt trigger (TAT), which captures a call to a busy telephone line without allowing the caller to hear a busy signal. The trigger is set after the subscriber registers with SCP 120. Also, the trigger is provisioned on SSP 110 to activate before a call waiting feature or any other terminating feature is activated. Preferably, the ICW client software automatically disables features such as call waiting before the subscriber dials the ISP number.

In step 207, PSTN caller 114 dials the telephone number of subscriber 112 while subscriber 112 is connected to ISP 124. This call triggers the termination attempt trigger in the subscriber's line. Upon capturing this call, SSP 110, in step 208, sends a Transactional Capabilities Application Part (TCAP) query to SCP 120 requesting instructions regarding disposition of the call. SCP 120 consults the SCP call setup table in database 122, compares the telephone number dialed by PSTN caller 114 to the list of active subscriber numbers stored in database 122 and retrieves the internet address of subscriber 112 from the SCP call setup table in database 122. After finding the corresponding entry in database 122, SCP 120 inserts the calling party related information (e.g., caller identification) into the SCP call setup table.

As shown in FIGS. 2b and 2d, in step 209 SCP 120 forwards to the internet address of subscriber 112 a notification message that advises subscriber 112 of an incoming call, lists any available calling party information (e.g., caller identification), and presents subscriber 112 with call disposition options. The subscriber's responses to these options are also included in step 209. Preferably, the notification message is a pop-up window on the PC screen of subscriber 112. The notification message prompts the user to choose between: 1) ignoring the call; 2) forwarding the call to voicemail or any other PSTN number; 3) accepting the call directly over the PSTN line and terminating the internet connection; 4) maintaining the internet connection and accepting the call through the computer using VOIP; or 5) holding the call until the subscriber accepts the call over PSTN, accepts the call over VOIP, or forwards the call, or until the caller hangs up. FIGS. 2b and 2c trace the call flow following the election of the fourth option, through which the present invention provides ICW-VOIP.

If subscriber 112 chooses to ignore the call, SCP 120 instructs SSP 100 to hold the call at SSP 110 and continue a ringing signal, with no further disposition of the call.

If subscriber 112 elects to forward the call, SCP 120 sends SSP 110 a TCAP message instructing SSP 110 to route the call to the originally specified subscriber number. Because the originally specified subscriber number line is busy, SSP 110 automatically forwards the call to a pre-determined voicemail number, to any other pre-determined PSTN number, or to a number chosen by subscriber 112 when subscriber 112 elects to forward the call.

If subscriber 112 chooses to drop the internet connection and accept the incoming call over the PSTN line, subscriber 112's software tears down the connection with ISP 124. SCP 120 detects the tearing down of the connection from a termination notification trigger (TCAP message) that was set when subscriber 112 connected to ISP 124. In response, SCP 120 sends a TCAP message to SSP 110, instructing SSP 110 to complete the call from PSTN caller 114 to subscriber 112. Subscriber 112 then answers the call over a PSTN line.

If subscriber 112 chooses to hold the call, SN 116 instructs SSP 110 to play an announcement at SSP 110, informing PSTN caller 114 that, for example, subscriber 112 is finishing another call. At that point, PSTN caller 114 could hang up or wait until subscriber 112 accepts the call over PSTN, accepts the call VOIP, or forwards the call.

As shown in FIGS. 2b and 2d, if subscriber 112 decides to continue the internet session and accept the call with VOIP, in step 210 SCP 120 forwards a bridging notification to SN 116, informing SN 116 that a VOIP call will be incoming and providing SN 116 with two pieces of bridging information: 1) the number of the calling party, PSTN caller 114, and 2) the number of subscriber 112. In step 211, SN creates an SN call setup table and enters this information. FIG. 2e illustrates this SN call setup table, where line 1 represents this first entry. The bridging information in the SN call setup table will enable SN 116 to bridge the VOIP call to the call from PSTN caller 114 when SN 116 receives these calls.

As shown in FIGS. 2c and 2d, in step 212, while SCP 120 is informing SN 116 of the incoming call, subscriber 112 initiates the incoming call. The incoming call is an H.323 call from subscriber 112 to gateway 128 through SSP 110, ISP 124, and firewall 127. This call includes the gateway access information that SCP 120 forwarded to subscriber 112 in step 205: gateway internet address, subscriber user identification, and subscriber password. Then in step 213, gateway 128 places a call to SSP 110 by dialing the subscriber number. This call hits the termination attempt trigger provisioned on SSP 110 that corresponds to the subscriber number. This hit is the second activation of the termination attempt trigger, thereby completing the double-triggering mechanism. In step 214, SCP 120 receives the trigger from SSP 110, consults database 122, and determines from the calling party number that the calling party is gateway 128. SCP 120 also recognizes from the called party number (which is the subscriber number) that the call originated from a particular subscriber, subscriber 112.

In step 215, knowing that gateway 128 is calling on behalf of subscriber 112, SCP 120 directs SSP 110 to route the call from gateway 128 to a gateway multi-line hunt group (MLHG) on SN 116. This routing instruction replaces the calling party number of call from the gateway with the subscriber number and replaces the called party number of the call from the gateway with the gateway MLHG number. The gateway MLHG is a switch feature that is pre-configured on SN 116 to terminate multiple calls under the same number. SN 116 uses one logical number for incoming calls but terminates each call on a different physical port.

In step 216, SSP 110 forwards the call from gateway 128 to the gateway MLHG on SN 116. SN 116 recognizes that the call is from gateway 128 based on the called party number (the gateway MLHG number). SN 116 also recognizes that the call was originally initiated by a particular subscriber based on the calling party number (the subscriber number).

In step 217, SN 116 inserts the MLHG port number in which the call from gateway 128 was received into the corresponding subscriber call entry of the SN call setup table. SN 116 informs SCP 120, preferably by a PC_CALL_Received message, that SN 116 has received a call from gateway 128 and that the call originated from subscriber 112. FIG. 2e shows the entry of the MLHG port number (port number 1) on line 2. SN 116 then waits for the PSTN call to arrive. SCP 120 looks up the subscriber information in the SCP call setup table of database 122 to determine the corresponding PSTN call. FIG. 2f illustrates what the SCP call setup table would look like at this point.

Then, in step 218, SCP 120 instructs SSP 110 to forward the corresponding PSTN call from PSTN caller 114 to a PSTN MLHG on SN 116. Like the gateway MLHG described above, the PSTN MLHG is pre-configured on SN 116 to receive multiple calls under one logical number and to terminate the calls on different physical ports. In step 219, SSP 110 forwards the call from PSTN caller 114 to SN 116.

When the call from PSTN caller 114 arrives at SN 116, SN 116 recognizes that the call is from PSTN caller 114 based on the multi-line hunt group number pre-configured for the PSTN call. Further, SN 116 recognizes that the call is for subscriber 112 by reading the calling party number (PSTN caller 114) and searching for the entry in the SN call setup table that has a PSTN caller number matching the calling party number. SN 116 adds the port number (port number 2) in which the call from PSTN caller 114 was received to this entry, and finds the MLHG port number in which the call from gateway 128 was received (this port number, port number 1, was recorded in the SN call setup table in step 217). As shown in the example in FIG. 2e on line 3, the call from the PSTN caller was received on port 2 and the call from gateway 128 was received on port 1. Knowing these corresponding ports (1 and 2), SN 116 then has all the information required to bridge the calls. SN 116 has a switching capability that can connect two voice ports.

Using the group of physical voice ports provisioned under one logical phone number as described in steps 216 and 218, in step 220 SN 116 bridges the two ports to connect the call from gateway 128 with the call from PSTN caller 114. Thus, in the example in FIG. 2e, SN 116 connects port 1 to port 2.

At this point, as shown in FIG. 2d, subscriber 112 is connected to PSTN caller 114 along the following path (shown as the thick lines 250 and 252 on FIG. 2d): from subscriber 112 to SSP 110 to ISP 124 to internet 126 to gateway 128 to SSP 110 to SN 116 to SSP 110, and to PSTN caller 114. On FIG. 2d, lines 250 and 252 illustrate this path. Line 250 from subscriber 112 to gateway 128 is the IP portion of the call, while line 252 from gateway 128 to PSTN caller 114 is the PSTN portion of the call. Subscriber 112 and PSTN caller 114 exchange voice communication over this path, while subscriber 112 maintains the internet connection through ISP 124. As subscriber 112 receives voice communication, the software provisioned on subscriber 112 converts the voice to packet-switched VOIP and transmits it to gateway 128. Gateway 128 converts the packet-switched data to PSTN and forwards it along the path to PSTN caller 114. For the return path, circuit-switched voice communication from PSTN caller 114 travels to gateway 128 where it is converted to VOIP and forwarded to subscriber 112.

In this call flow, in terms of call signaling and voice codec (analog-digital coding and decoding), the main function of gateway 128 is to convert IP (e.g., H.323) signals to PSTN, and PSTN signals to IP. This function does not include determining to what IP address the converted PSTN signals should go, which is the function of SCP 120. Instead, to convert PSTN signals to IP signals, gateway 128 samples and packetizes the voice PSTN signals, translates the PSTN signaling information into IP signaling information, and sends the voice packets to subscriber 112. In the reverse direction, from IP to PSTN, gateway 128 does the opposite, receiving H.323 signals, converting them to Q.931 signals, depacketizing the voice packets, and delivering them to the PSTN voice line. In this call flow, gateway 128 does no PSTN-to-IP mapping and merely handles the low-level process of converting PSTN signals to IP signals, and vice-versa.

Once the VOIP connection is established between subscriber 112 and PSTN caller 114, in step 221 SN 116 informs SCP 120 that subscriber 112 and PSTN caller 114 are connected by VOIP. In the preferred embodiment of the present invention, SN 116 remains in the communication path, as opposed to dropping out and pushing the call connection to SSP 110. Retaining SN 116 in the communication loop keeps SCP 120 connected to and in control of the call so that the system can provide further services, such as call forward over VOIP and call revert to PSTN. Thus, for example, if subscriber 112 decides to disconnect the connection with PSTN caller 114 and call a third party, a message is sent to SCP 120, which forwards the message to SN 116. In response, SN 116 breaks the bridge of the first call with PSTN caller 114 and initiates another call to the third party. When the third party answers the call from SN 116, SN 116 bridges the call from subscriber 112 to the call from the third party. However, SN 116 could drop out of the loop, once it completes the essential function of receiving calls from subscriber 112 and PSTN caller 114 and bridging them together.

Overall, the ICW-VOIP architecture and call flows compensate for the inability of gateways to initiate PSTN-to-IP communication.

Alternate Embodiment of System Operation

Figure 3:
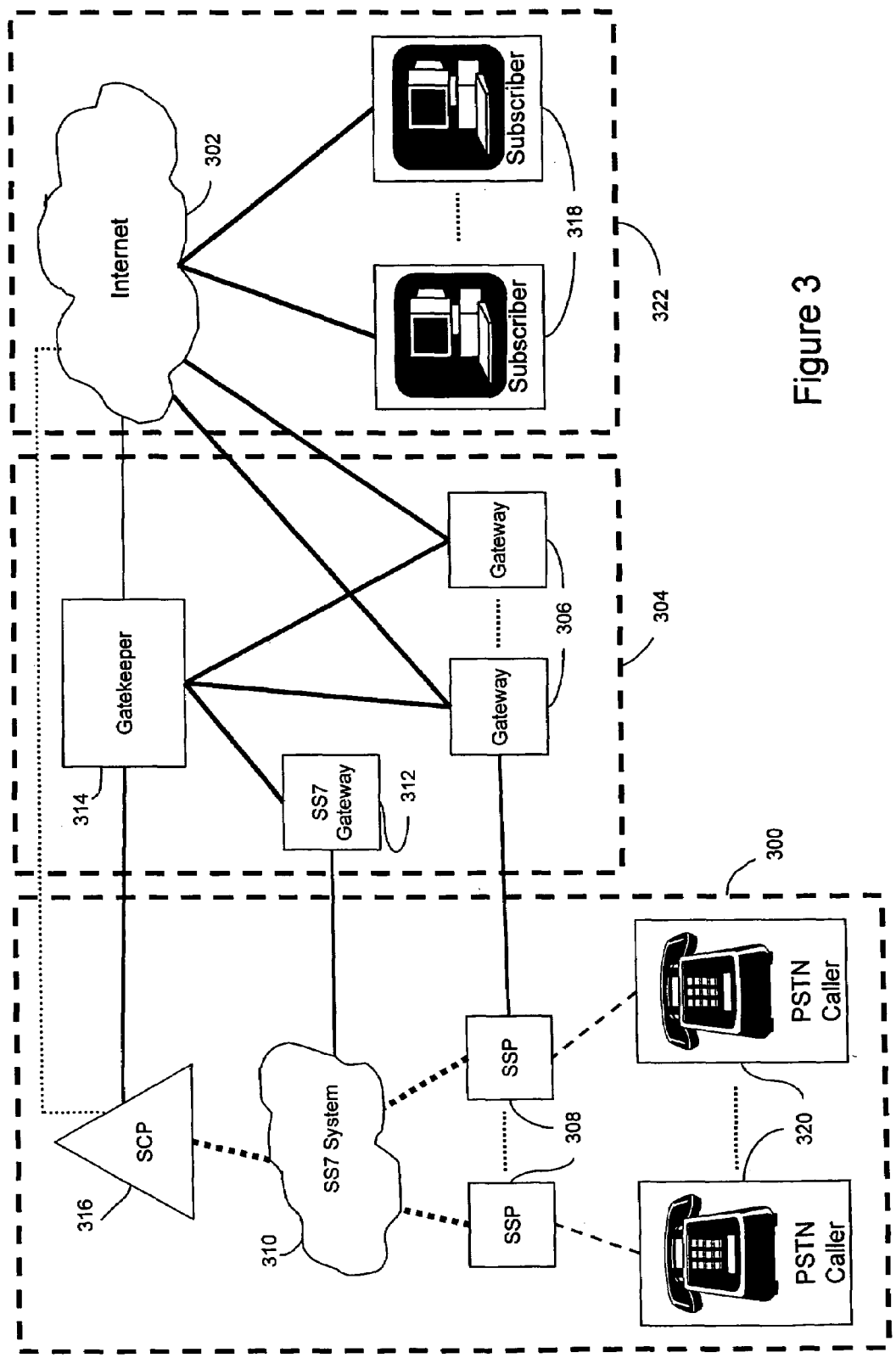
FIG. 3 is a schematic diagram of an ICW-VOIP architecture incorporating advanced gateway capabilities.

While the preferred embodiment compensates for gateway limitations, this alternate preferred embodiment of the present invention contemplates technical advances in gateways and accommodates their anticipated new role. FIG. 3 illustrates an ICW-VOIP architecture incorporating advanced gateway capabilities. A conventional PSTN infrastructure 300 connects to the internet 302 through a virtual switch 304, consisting of gateways and a gatekeeper. Gateways 306 in virtual switch 304 communicate with SSPs 308 in PSTN infrastructure 300. In addition, Signaling System 7 (SS7) 310 communicates with SS7 gateway 312, and gatekeeper 314 communicates with SCP 316 and all of the gateways within virtual switch 304. From the internet side 322, internet 302 is connected to gatekeeper 314 and subscribers 318 connect to gateways 306 through internet 302. PSTN callers 320 connect directly to SSPs 308.

In this architecture, the gatekeeper performs the registration, administration, bandwidth management, call control, and call setup that SCP 120 handled in the first embodiment. As a whole, the gateway/gatekeeper combination in virtual switch 304 performs functions similar to SSPs. Virtual switch 304 handles SS7 communication to seamlessly converge the PSTN and IP networks, so that ordinary PSTN calls can be passed back and forth between the PSTN and IP infrastructures. Preferably, to enable this seamless convergence, SCP 316 supports all commercially available H.323 communication software in its connection with gatekeeper 314.

The call flows in this architecture are as follows. A call from PSTN callers 320 hits a trigger provisioned on SSPs 308, sending a trigger message up to SS7 310. In response to this trigger, SS7 310 uses its direct SS7 connection with SS7 gateway 312 to send a message to gatekeeper 314. A virtual telephone number is pre-configured on gatekeeper 314 in a manner similar to the pre-configuring of the MLHG on SN 116 in the first embodiment. While SS7 310 is communicating with gatekeeper 314, SCP 316 also contacts gatekeeper 314 to provide registration information. Seeing the call to the virtual telephone number, gatekeeper 314 recognizes that a VOIP connection is being requested and consults the registration information to determine the call setup. Using an appropriate gatekeeper-to-gateway communication protocol (e.g., H.323 single gateway control protocol, media gateway control protocol, or internet protocol device control), gatekeeper 314 then communicates with gateways 306 to set up a trunk for the incoming call. With call set up complete, gatekeeper 314 initiates a call from internet 302 and bridges the call with the incoming PSTN call. Once bridged, the call from PSTN callers 320 is connected through internet 302 to subscribers 318, making voice communication possible.

As a part of this alternate embodiment, a multiple control unit (MCU) could be used to enable conferencing. In the conventional networks, conferencing is accomplished solely within the confines of either the PSTN infrastructure or the IP infrastructure. By merging and mixing voice and data signals, the MCU enables data exchange between the PSTN and IP networks.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing an internet call waiting—voice over internet protocol service comprising:
   receiving at a service switching point an incoming telephone call to a subscriber connected to an internet, wherein the incoming call activates a trigger provisioned on the service switching point, which sends a first query to a service control point;
   forwarding bridging information from the service control point to a service node;
   receiving an internet protocol call from the subscriber at a gateway;
   placing a gateway call from the gateway to the service switching point in response to the internet protocol call from the subscriber;
   routing the gateway call to the service node;
   forwarding the incoming telephone call from the service switching point to the service node; and
   connecting the gateway call and the incoming telephone call at the service node.

2. The method of claim 1, wherein the gateway call to the service switching point activates the trigger for a second time, which sends a second query to the service control point.

3. The method of claim 2, wherein the routing the gateway call to the service node comprises:
   sending a routing instruction from the service control point to the service switching point in response to the second query; and
   routing the gateway call to a gateway multi-line hunt group (MLHG) on the service node in response to the routing instruction,
   wherein the routing instruction includes a telephone number of the subscriber and a number of a MLHG pre-provisioned on the service node.

4. The method of claim 1, wherein connecting the gateway call and the incoming telephone call comprises:
   forwarding the gateway call to a first port of a gateway multi-line hunt group (MLHG) provisioned on the service node;
   forwarding the incoming telephone call on a second port of a public-switched telephone network (PSTN) MLHG provisioned on the service node; and
   bridging the first port to the second port.

5. The method of claim 1, wherein the service node maintains the connection between the subscriber and the incoming telephone call.

6. The method of claim 1, wherein the gateway converts the internet protocol call into a PSTN call.

7. The method of claim 1, wherein the service node is integrated into the gateway.

8. The method of claim 1, wherein the bridging information comprises a telephone number of the incoming telephone call and a telephone number of the subscriber.

9. A method for providing an internet call waiting—voice over internet protocol (ICW-VOIP) service comprising:
   receiving at a service switching point an incoming call from a PSTN caller to a subscriber connected to an internet;
   sending a query from the service switching point to a service control point;
   providing options associated with the incoming call to the subscriber, wherein one of the options is "accept the incoming call over the VOID and maintain internet connection,"
   wherein if the "accept the incoming call over the VOID and maintain internet connection" option is selected, the method further comprises:
   forwarding bridging information from the service control point to a service node;
   receiving an internet protocol call from the subscriber at a gateway;
   placing a gateway call from the gateway to the service switching point in response to the internet protocol call from the subscriber;
   sending a second query from the service switching point to the service control point;
   sending a routing instruction from the service control point to the service switching point;
   forwarding the gateway call from the service switching point to the service node according to the routing instruction;
   forwarding the incoming call from the service switching point to the service node; and
   bridging the incoming call and the gateway call at the service node.

10. The method of claim 9, wherein the service node bridges the incoming call and the gateway call by bridging a first port in a gateway multi-line hunt group (MLHG) holding the gateway call and a second port in a PSTN MLHG holding the incoming call.

11. The method of claim 9, wherein the options further include "ignore the incoming call," "forward the incoming call," "accept the incoming call over a PSTN line and disconnect internet connection," and "hold the incoming call."

12. The method of claim 11, wherein if the "ignore the incoming call" option is selected, the service control point instructs the service switching point to hold the incoming call at the service switching point and continue ringing.

13. The method of claim 11, wherein if the "forward the incoming call" option is selected, the service control point instructs the service switching point to forward the incoming call to a number selected from the group consisting of a number chosen by the subscriber and a pre-determined number.

14. The method of claim 11, wherein if the "accept the incoming call over PSTN line and disconnect internet connection" option is selected, the service control point instructs the service switching point to terminate the incoming call to the subscriber.

15. The method of claim 11, wherein if the "hold the call" option is selected, the service node instructs the service switching point to play an announcement to the PSTN caller.

16. A system for providing an internet call waiting—voice over internet protocol service comprising:
   a public switched telephone network (PSTN) infrastructure including a service switching point connected to a service node, and a service control point connected to the service switching point and the service node, wherein the PSTN infrastructure is to be connected to an internet network including an internet service provider connected to an internet and a gateway connected to the internet,
   wherein the gateway is to converts internet protocol voice communications into PSTN voice communications, and wherein the service node is to act as a bridge and to connect an incoming call from a PSTN caller to a subscriber connected to the internet, through the gateway.

17. The system of claim 16, wherein the service node comprises:
means for receiving a first call from the subscriber through the gateway and the service switching point;
means for receiving the incoming call through the service switching point; and
means for connecting the first call and the incoming call.

18. The system of claim 16, wherein the service node is to maintain the connection between the incoming call and the subscriber.

19. The system of claim 16, wherein the service control point comprises:
means for storing call setup information;
means for sending gateway access information to the subscriber;
means for sending bridging information to the service node; and
means for displaying a notification message to the subscriber regarding an incoming telephone call.

* * * * *

UNITED STATES PATENT AND TRADEMARK OFFICE
CERTIFICATE OF CORRECTION

| | | |
|---|---|---|
| PATENT NO. | : 7,342,919 B2 | Page 1 of 1 |
| APPLICATION NO. | : 10/703531 | |
| DATED | : March 11, 2008 | |
| INVENTOR(S) | : Li Zhang et al. | |

It is certified that error appears in the above-identified patent and that said Letters Patent is hereby corrected as shown below:

Claim 16, at col. 16, line 65, the term "converts" has been corrected to read --convert--.

Signed and Sealed this

Seventeenth Day of June, 2008

JON W. DUDAS
*Director of the United States Patent and Trademark Office*